(12) United States Patent
Groll

(10) Patent No.: US 6,544,669 B2
(45) Date of Patent: Apr. 8, 2003

(54) CRYOGENIC TREATMENT OF COOKWARE AND BAKEWARE

(75) Inventor: William A. Groll, McMurray, PA (US)

(73) Assignee: Clad Metals LLC, Canonsburg, PA (US)

(*) Notice: Subject to any disclaimer, the term of this patent is extended or adjusted under 35 U.S.C. 154(b) by 0 days.

(21) Appl. No.: 09/939,301

(22) Filed: Aug. 24, 2001

(65) Prior Publication Data
US 2002/0040905 A1 Apr. 11, 2002

Related U.S. Application Data

(60) Provisional application No. 60/227,701, filed on Aug. 24, 2000.

(51) Int. Cl.$^7$ ............... B32B 31/14; C21D 6/04; F25D 17/02
(52) U.S. Cl. ............... 428/687; 62/64; 148/517; 148/531; 148/532; 148/537; 148/577; 148/578; 220/573.2; 428/544; 428/615; 428/621; 428/624; 428/626; 428/627; 428/652; 428/653; 428/676; 428/677; 428/681; 428/421; 428/457; 428/698; 428/908.8; 428/938
(58) Field of Search ............... 428/687, 544, 428/615, 621, 624, 626, 627, 652, 653, 676, 677, 681, 421, 457, 698, 908.8, 938; 220/573.2; 62/64; 148/517, 531, 532, 537, 577, 578

(56) References Cited

U.S. PATENT DOCUMENTS

| | | |
|---|---|---|
| 4,484,988 A | 11/1984 | Robinson |
| 4,621,026 A | 11/1986 | Robinson |
| 5,259,200 A | 11/1993 | Kamody |
| 5,851,313 A | 12/1998 | Milam |
| 5,865,913 A | 2/1999 | Paulin et al. |
| 5,875,636 A | 3/1999 | Kamody |
| 6,105,374 A * | 8/2000 | Kamody .......... 62/64 |

FOREIGN PATENT DOCUMENTS

| | | |
|---|---|---|
| EP | 0966910 A1 | 12/1999 |
| WO | WO 00/06960 A1 | 2/2000 |

* cited by examiner

*Primary Examiner*—Robert R. Koehler
(74) *Attorney, Agent, or Firm*—Webb Ziesenheim Logsdon Orkin & Hanson, P.C.

(57) ABSTRACT

A method of making cookware and bakeware having a stick resistant and mar resistant cook surface comprising the steps of providing a cooking utensil having a cook surface, and cryogenically treating the cooking utensil at one or more selected temperatures comprising –100° F. to –300° F. or lower to harden said cook surface. The cooking utensil may have a bare metal cook surface, or it may be coated with a stick resistant coating such as one of a PTFE, metal nitride or sulfide coating or combinations thereof prior to the cryogenic hardening treatment.

25 Claims, 1 Drawing Sheet

CRYOGENIC TREATMENT OF COOKWARE AND BAKEWARE

CROSS-REFERENCE TO RELATED APPLICATION

This application claims the benefit under 35 USC §119(e) of U.S. Provisional Application Ser. No. 60/227,701 filed Aug. 24, 2000, entitled "Cryogenic Treatment of Cookware and Bakeware".

BACKGROUND OF THE INVENTION

1. Field of the Invention

The present invention relates generally to cookware and, more particularly, to stick resistant cook surfaces and methods of making the cook surface more stick resistant and more resistant to scratching, abrasion and marring.

2. Description of the Prior Art

In vessels that are used for cooking or baking, such as pots or pans and the like, it is desirable that the vessel warms or heats evenly across its bottom and sides when placed on a stovetop burner or into an oven. It is also desirable that the inner surface of the vessel, i.e., the cook surface that comes in contact with the food being prepared, be constructed such that the food being prepared does not deposit, adhere or stick to the inner surface. Although the properties above are important, it is also vital that cooking or baking vessels be resistant to damage if dropped as well as resistant to corrosion resulting from regular use and cleaning.

The use of multi-layer composites or clad metal products of three metal layers or less is well-known in the cookware and bakeware art. For example, stainless steel cooking utensils with a copper bottom are known, as well as aluminum cored stainless steel. A particular problem with cookware made from these types of materials is an inability to get quick and even heat transfer over the entire pan.

Many attempts have been made to overcome the above-mentioned problem. U.S. Pat. Nos. 4,103,076; 4,246,045; 4,646,935 and others to Ulam disclose multi clad cooking vessels. My more recent patents, U.S. Pat. Nos. 6,267,830 and 6,109,504 to Groll, are directed to improved copper core multi-layer component cookware and griddle plate, respectively. The disclosures of the above-mentioned Ulam patents as well as my own patents are incorporated by reference herein. An example of the disclosed cooking utensils is a nine-ply material consisting of a copper core clad on each side with layers of pure and alloyed aluminum, which is, in turn, clad on both sides with stainless steel. The utensils disclosed provide improved heat distribution and stick resistance, but there remains an ever-present demand to improve stick resistance of bare metal cook surfaces as well as to increase the mar resistance and increase the life of stick resistant coatings.

In order to overcome the problem of food sticking to the cooking surface, it has become common practice to coat the cooking surface of cooking or baking vessels with non-stick materials such as amorphous fluorocarbon polymers. Examples of commercially available amorphous fluorocarbon polymers are those sold under the trade name Teflon® by E. I. DuPont de Nemours Co., Inc. of Wilmington, Del. Examples of these types of coatings used in cookware and bakeware are disclosed in U.S. Pat. No. 5,863,608 to Swisher et al., which is also incorporated by reference herein. However, amorphous fluorocarbon polymer coated vessels for cooking and baking tend to lose their non-stick quality over time as the coating can be easily scratched, abraded or otherwise marred or worn away because of its generally soft texture and as the fluorocarbon polymer loses its lubricity over time. These fluorocarbon polymer coatings are oftentimes referred to as "PTFE" coatings.

I have found that metal surfaces can have improved non-stick or reduced friction properties if they are made harder. In the case of multi-layer clad cookware, where softer heat conducting metals such as aluminum and/or copper are used as the core metal, which is then laminated on both sides with a harder metal such as stainless steel, the cook surface is generally softer than might be attained without a laminated metal. Metals, such as stainless steel, can be hardened by austenitizing and tempering at very high temperatures. When a softer metal core, such as copper or aluminum, is used in a laminate, the ideal temperatures for tempering or austenitizing stainless steel would melt the lower melting point core metal. Such a heat treatment would result in warping or deformation of the multi-layer, composite cooking utensil. Therefore, optimum hardening temperatures for tempering and austenitizing steel cannot be used with composite metals containing aluminum and/or copper. This results in a less hard and less than ideal cook surface.

There remains an unmet need for cookware and bakeware that have excellent and uniform heat transfer properties while providing a reliable and durable non-stick cooking surface, be it a bare metal surface, a PTFE type coating or other coated surfaces such as vapor deposited ceramic nitrides.

SUMMARY OF THE INVENTION

The present invention is directed to cookware, bakeware and other food preparation surfaces such as grills and griddles that have increased surface hardness and improved stick resistance and longer life stick resistant coatings, in the case of coated cookware. The instant cookware, bakeware and other food preparation surfaces are made from metals, either bare or precoated with a non-stick coating, which have been cryogenically processed to increase their hardness.

The present invention is further directed to a method of making cookware, bakeware and like food preparation surfaces, hereinafter collectively referred to as "cookware". The method includes the steps of forming a clad sheet of metal with a core of aluminum or copper laminated on one or both sides with stainless steel, aluminum or the like. The clad sheet is then cryogenically tempered at less than −100° F. and more preferably less than −275° F. Ideally, the cookware, in either a bare or coated condition, is subjected to a cyclic cryogenic treatment wherein the temperature is cycled between about −100° F. to −280° F. or −300° F. or lower for a period of time and then subjected to a temper treatment at about +280° F. to +300° F.

DESCRIPTION OF THE PREFERRED EMBODIMENTS

Figure 1:
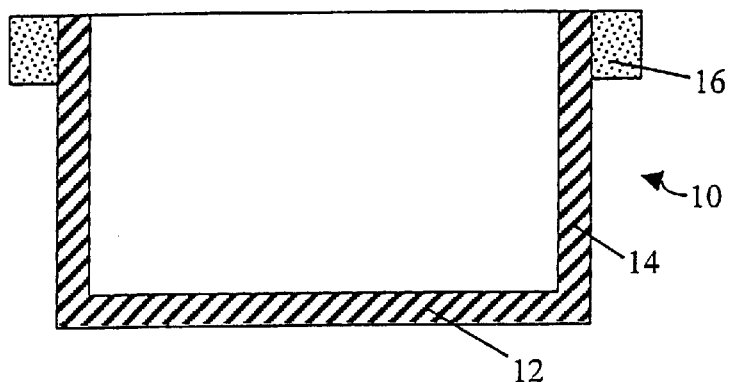
FIG. 1 is a side view of a typical cookware vessel according to the present invention.

FIG. 1 is a sectional view of a cooking utensil 10 constructed for use in connection with the present invention. Cooking utensil 10 preferably has a horizontal bottom wall 12, upstanding side walls 14, and one or more handles 16. The vessel may be formed from a single blank of metal which may have a plurality of plies roll bonded together using processes known in the art and subsequently cryogenically hardened as will be explained below. The utensil 10 may take various forms including the illustrated stockpot, skillets, fry and sauce pans, griddles, or numerous other bakeware and cookware items.

Figure 2:
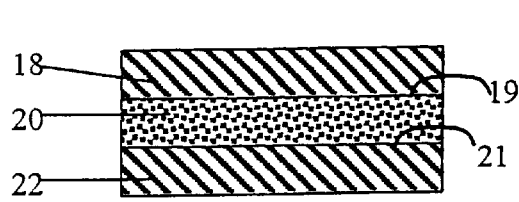
FIG. 2 is an enlarged sectional view showing the wall of a cookware vessel according to an embodiment of the present invention.

The wall of utensil 10 schematically shown in FIG. 2 has a core layer 20 made of a good heat conducting metal, such as aluminum or copper. An outer layer 22 made of a hard metal, such as stainless steel or carbon steel, is clad on an outer side 21 of core layer 20. An inner layer 18, made of a hard metal, such as stainless steel or carbon steel, is clad on an inner side 19 of core layer 20. The inner layer 18 defines the cook surface of the utensil.

Figure 3:
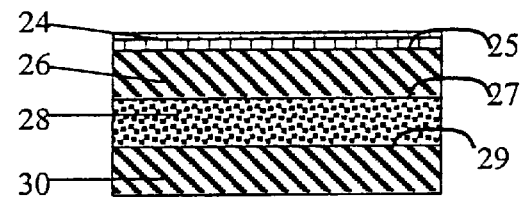
FIG. 3 is an enlarged sectional view showing the wall of a cookware vessel according to an embodiment of the present invention.

Another example of a utensil wall useful in connection with the present invention is shown in FIG. 3, which has a core layer 28 made of a good heat conducting metal, such as aluminum or copper. An outer layer 30 made of a hard metal, such as stainless steel or carbon steel, is clad on an outer side 29 of core layer 28. An inner layer 26 made of a hard metal, such as stainless steel or carbon steel, is clad on an inner side 27 of core layer 28. A non-stick coating 24 of PTFE or a vapor deposited layer of a ceramic nitride such as titanium nitride or zirconium is applied to inner cook surface 25 of inner layer 26.

Figure 4:
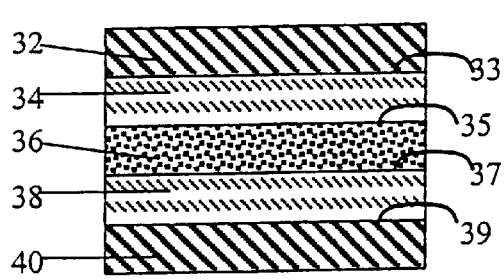
FIG. 4 is an enlarged sectional view showing the wall of a cookware vessel according to an embodiment of the present invention.

A further example of a utensil wall which is useful in connection with the present invention is shown in FIG. 4, which has a core layer 36 made of copper. An outer intermediate clad layer 38 made of aluminum is clad on an outer side 37 of core 36. An outer layer 40 made of a hard metal, such as stainless steel or carbon steel, is clad on an outer side 39 of outer intermediate clad layer 38. Conversely, it is also known in the art to dispense with the steel layer 40 and merely anodize the exposed surface of the aluminum layer 38. An inner intermediate clad layer 34 made of aluminum is clad on an inner side 35 of core 36. An inner layer 32 made of a hard metal, such as stainless steel or carbon steel, is clad on an inner side 33 of inner intermediate clad layer 34.

Figure 5:
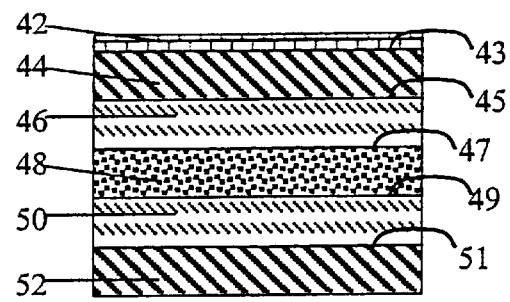
FIG. 5 is an enlarged sectional view showing the wall of a cookware vessel according to an embodiment of the present invention.

Still another example of a utensil wall which is useful in connection with the present invention is shown in FIG. 5, which has a core layer 48 made of copper. An outer intermediate clad layer 50 made of aluminum is clad on an outer side 49 of core 48. An outer layer 52 made of a hard metal, such as stainless steel or carbon steel, is clad on an outer side 51 of outer intermediate clad layer 50. As in the embodiment of FIG. 4, the steel layer 52 can be eliminated by anodizing the outer surface of the aluminum layer 50. An inner intermediate clad layer 46 made of aluminum is clad on an inner side 47 of core 48. An inner layer 44, made of a hard metal, such as stainless steel or carbon steel, is clad on side 45 of inner intermediate clad layer 46. A non-stick coating 42 is applied to an outer surface 43 of inner layer 44.

Figure 6:
FIG. 6 is an enlarged sectional view showing the wall of a cookware vessel according to an embodiment of the present invention.

A final example of a utensil wall which is useful in connection with the present invention is shown in FIG. 6, in the form of a flat griddle plate which includes a base metal 56 which is a hard metal, such as stainless steel, carbon steel or titanium. A non-stick coating 54 is applied to surface 58 of base metal 56.

The non-stick coating can be any such coating known in the art. Examples of commercially available PTFE amorphous fluorocarbon polymers are those sold under the trade name Teflon® by E. I. DuPont de Nemours Co., Inc. of Wilmington, Del. The amorphous fluorocarbon polymer coating can be applied directly to the metal surface. Preferably, an adhesion or primer layer is applied to the metal surface and an amorphous fluorocarbon polymer containing coating is applied on top of the adhesion layer. Most preferably, an adhesion layer is applied to the metal surface, a protective or midcoat layer is applied on top of the adhesion layer to help provide scratch resistance, and an amorphous fluorocarbon polymer containing coating is applied on top of the midcoat layer. U.S. Pat. No. 5,240,775 to Tannenbaum, herein incorporated by reference, discloses such non-stick coatings.

Alternatively, the non-stick coating can be a metal nitride or sulfide containing coating applied to the metal surface. Representatives of suitable metallic compounds for use herein are nitrides or sulfides of tungsten, molybdenum, lead, tin, copper, calcium, titanium, zirconium, zinc, chromium, iron, antimony, bismuth, silver, cadmium and alloys and mixtures thereof. Vapor deposited coatings of TiN, ZrN and $WS_2$ are presently preferred.

The non-stick coating composition of the present invention may also be a composition that contains both an amorphous fluorocarbon polymer and a metal nitride or sulfide. Such surface coating compositions are disclosed in U.S. Pat. Nos. 5,262,241 and 5,403,882 to Huggins, incorporated herein by reference.

The non-stick coating composition can be applied to the metal surface in any manner known in the art. For example, the non-stick coating can be applied by spraying, dipping or rolling the coating onto the metal surface. A preferred method for applying the non-stick coating to the metal surface is by vapor deposition. Such methods are well-known in the art, such as the methods disclosed in U.S. Pat. No. 5,340,604 to Atsushi which is also incorporated by reference herein. The non-stick coating will be of a thickness to allow it to perform its function. The thickness can vary from a few angstroms to several microns.

The metal substrate used to make the cooking utensils of the present invention can be any suitable metal known in the art for making such products. Acceptable metals include copper, aluminum, stainless steel, carbon steel, iron, Hasteloy® and titanium. Preferably, the metal will be a clad composite metal substrate with a core having good thermal conductivity, such as copper and/or aluminum. Examples of acceptable clad metal composite substrates are shown in FIGS. 2 and 4. Additional examples of acceptable composite metal substrates are disclosed in U.S. Pat. Nos. 4,103,076; 4,246,045; and 4,646,935 to Ulam, and U.S. Pat. Nos. 6,109,504 and 6,267,830 to Groll which collectively are, likewise, incorporated by reference herein.

The cooking utensils of the present invention are cryogenically tempered to harden the metal substrate and non-stick coating, if applied to the inner cook surface. Cryogenic tempering closes and refines grain structures, reduces retained stresses, reduces wear and surface roughness; increases dimensional stability and increases durability and hardness. It is believed that the improved hardness of the metal or non-stick surface leads to an improved non-stick characteristic for the resulting cooking utensil.

The cooking utensil may be cryogenically tempered as follows: the utensils are slowly cooled to less than –100° F., preferably less than –300° F. Any suitable rate of cooling can be used; however, it is presently preferred that the utensil is cooled at about one degree per minute. The utensil is then held at –100° F., preferably less than –300° F. for about one to sixty hours, depending on the particular utensil. After the cryogenic tempering, the utensil temperature is slowly raised to about 2500 to 350° F. Any suitable rate of heating can be used, but it is preferred that the utensil is heated at about one degree per minute. The utensil is then cooled to ambient temperature.

The cryogenic treatment is applicable to cookware having either a bare cooking surface or one coated with a PTFE or vapor deposited meal nitride or sulfide non-stick surface. Another presently preferred method of cryogenically tempering the cookware of the present invention comprises the steps of slowly cooling the cookware from an ambient temperature to a temperature below about –100° F., followed by cooling to about –300° F. and repeating the steps. The thermal cycle of cooling and heating the cookware at controlled rates between –100° F. and about –300° F. is repeated a number of times, such as, for example, 6–8 times wherein each cycle between heating and cooling may take about 1 to 1½ hours. After the last cycle, the cookware may be heated at a controlled rate to about +200° F.–300° F. and held for several hours for tempering purposes. The cryogenic tempering does not have to be applied to the final formed cooking utensil. Alternatively, a metal or metal clad sheet can be cryogenically tempered as described and subsequently formed into a cooking utensil. It is also contemplated as part of the present invention that the utensil, metal or clad metal may be coated with a non-stick coating, such as Teflon® or other non-stick coatings such as vapor deposited ZrN or TiN, $WS_2$ and the like, prior to cryogenic tempering. Cryogenic tempering of the coated utensil or metal sheet serves to harden both the substrate metal as well as the non-stick coating. In this way, the non-stick surfaces have improved non-stick properties, are more resistant to scratching, and retain their non-stick property over a longer period of time.

While multi-layer composite metal cookware is ideally suited for cryogenic hardening according to the present invention, it will be understood that cooking utensils of a single ply of, for example, iron, aluminum, stainless steel, titanium and the like, both bare and coated with the above-disclosed coatings, fall within the intended scope of the present invention.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention.

I claim:

1. A method of making a stick resistant and mar resistant cook surface comprising the steps of:
   (a) providing a cooking utensil having a cook surface; and
   (b) cryogenically treating the cooking utensil at temperatures comprising –100° F. or lower to harden said cook surface and thereafter raising the temperature to a temperature between ambient and +300° F., whereby the hardness and stick resistance of the cook surface is improved over an untreated surface.

2. The method of claim 1 wherein the cooking utensil includes cookware, bakeware, grill plates and griddle plates.

3. The method of claim 1 wherein the cooking utensil consists of a single ply of metal.

4. The method of claim 3 wherein the metal is one selected from the group consisting of aluminum, iron, stainless steel and titanium.

5. The method of claim 3 wherein said cook surface is coated with a stick resistant coating prior to said cryogenic treating step.

6. The method of claim 1 wherein the cooking utensil comprises a multi-layer clad metal construction having one or more core layers of a metal having a melting point lower than one or more outer metal layers.

7. The method of claim 6 wherein said cook surface is coated with a stick resistant coating prior to said cryogenically treating step (b).

8. The method of claim 7 wherein the stick resistant coating includes one of a PTFE coating, a metal nitride or sulfide-containing coating, and mixtures of said PTFE, metal nitride or sulfide-containing coating.

9. The method of claim 8 wherein the coating is a PTFE coating.

10. The method of claim 8 wherein the coating is a metal nitride consisting of zirconium nitride.

11. The method of claim 1 wherein the cryogenically treating step includes thermally cycling the cookware at temperatures between –100° F. and –300° F. and including a final thermal tempering step comprising heating the cookware from a cryogenic temperature up to an elevated temperature between about +200° F. and +300° F. and cooling the cookware to ambient temperature.

12. A method of making a stick resistant and mar resistant cooking utensil comprising the steps of:
   (a) providing a cooking utensil comprising a multi-layer clad metal construction having a core including one or both of copper and aluminum and one or more layers of stainless steel, bonded to said core, wherein an inner layer of stainless steel defines a cook surface; and
   (b) cryogenically treating the cooking utensil at one or more temperatures of –100° F. or lower to harden the cook surface.

13. A method of making a stick resistant and mar resistant cooking utensil comprising the steps of:
   (a) providing a cooking utensil comprising a multi-layer clad metal construction having a core including one or both of copper and aluminum and one or more layers of stainless steel, bonded to said core, wherein an inner layer of stainless steel defines a cook surface;
   (b) applying a stick resistant coating to said cook surface; and
   (c) cryogenically treating the cooking utensil at temperatures of –100° F. or lower to harden the cook surface.

14. The method of claim 13 wherein the stick resistant coating includes one of a PTFE coating, a metal nitride or sulfide-containing coating, and mixtures of said PTFE, metal nitride or sulfide-containing coating.

15. The method of claim 13 wherein the coating is a PTFE coating.

16. The method of claim 13 wherein the coating is a metal nitride consisting of zirconium nitride.

17. The method of claim 12 wherein the cryogenically treating step includes thermally cycling the cookware at temperatures between –100° F. and –300° F. and including a final thermal tempering step comprising heating the cookware from a cryogenic temperature up to an elevated temperature between about +200° F. and +300° F. and cooling the cookware to ambient temperature.

18. The method of claim 13 wherein the cooking utensil includes cookware, bakeware, grill plates, and griddle plates.

19. The method of claim 13 wherein the cooking utensil comprises bakeware and the stick resistant coating consists of a zirconium nitride coating.

20. The method of claim 13 wherein the cookware comprises one of a fry pan, saucepan and stockpot, and the stick resistant coating consists of a PTFE coating.

21. A cooking utensil comprising one or more layers of (aluminum having a cook surface, said cooking utensil having been subjected to a cryogenic treatment whereby the hardness and stick resistance of the cook surface is improved over an untreated surface.

22. The cooking utensil of claim 21 wherein the cook surface consists of bare metal.

23. The cooking utensil of claim 21 wherein the cook surface is coated with a PTFE non-stick coating prior to said cryogenic treatment.

24. A cooking utensil having a polymeric non-stick coating applied to a cook surface, said cooking utensil having been subjected to a cryogenic treatment whereby the hardness and stick resistance of the cook surface is improved over an untreated surface.

25. The cooking utensil of claim 24 wherein the polymeric non-stick coating is PTFE based.

* * * * *

UNITED STATES PATENT AND TRADEMARK OFFICE
CERTIFICATE OF CORRECTION

PATENT NO.   : 6,544,669 B2
DATED        : April 8, 2003
INVENTOR(S)  : William A. Groll It is certified that error appears in the above-identified patent and that said Letters Patent is hereby corrected as shown below:

<u>Column 5,</u>
Line 12, "about 2500" should read -- about 250º --.

<u>Column 7,</u>
Line 15, before "aluminum having" delete parenthesis.

Signed and Sealed this

Fourteenth Day of October, 2003

JAMES E. ROGAN
*Director of the United States Patent and Trademark Office*